United States Patent [19]

Jönsson et al.

[11] Patent Number: 4,819,184

[45] Date of Patent: Apr. 4, 1989

[54] METHOD AND A DEVICE FOR OPTIMUM CONTROL OF CONTROL PARAMETERS IN AN INDUSTRIAL ROBOT

[75] Inventors: Sven Jönsson; Erik Persson; Lars Östlund, all of Västerås, Sweden

[73] Assignee: ASEA Aktiebolag, Västerås, Sweden

[21] Appl. No.: 102,516

[22] Filed: Sep. 29, 1987

[30] Foreign Application Priority Data

Sep. 29, 1986 [SE] Sweden ............... 8604102
Sep. 29, 1986 [SE] Sweden ............... 8604103

[51] Int. Cl.⁴ .......................................... G05B 13/00
[52] U.S. Cl. .................................. 364/513; 364/191; 901/3; 901/9; 901/15
[58] Field of Search ............... 364/513, 191–193; 318/568; 901/2–5, 9, 14, 15

[56] References Cited

U.S. PATENT DOCUMENTS

| | | |
|---|---|---|
| 4,218,172 | 8/1980 | Freund . |
| 4,362,978 | 12/1982 | Pollard et al. . |
| 4,547,858 | 10/1985 | Horak ................... 364/513 |
| 4,594,671 | 6/1986 | Sugimoto et al. ........... 364/513 |
| 4,621,332 | 11/1986 | Sugimoto et al. ........... 364/513 |
| 4,680,519 | 7/1987 | Chand et al. ........... 364/513 X |
| 4,716,350 | 12/1987 | Huang et al. ........... 364/513 X |
| 4,718,078 | 1/1988 | Bleidorn et al. ........... 364/513 X |
| 4,725,942 | 2/1988 | Osuka ................... 364/513 |
| 4,725,965 | 2/1988 | Keenan ................... 364/513 |

FOREIGN PATENT DOCUMENTS

| | | |
|---|---|---|
| 0123391 | 10/1984 | European Pat. Off. . |
| 0128355 | 12/1984 | European Pat. Off. . |
| 0196417 | 10/1986 | European Pat. Off. . |
| 2656433 | 6/1978 | Fed. Rep. of Germany . |
| 2146801 | 4/1985 | United Kingdom . |

Primary Examiner—Allen MacDonald
Attorney, Agent, or Firm—Pollock, Vande Sande & Priddy

[57] ABSTRACT

An industrial robot has a position controller for each one of the axes of the robot and a computer for control of the robot. The computer continuously determines, with the aid of a mathematical model set up in advance, in dependence on the robot configuration and load in question, the mass moment of inertia of the axes, the coupled mass moment of inertia, and the moment caused by gravity. From the relationships between acceleration/deceleration and the drive motor torque for the different axes, the maximum available acceleration/deceleration for the axis is determined while assuming that maximum motor torque prevails for each axis. For each axis this value is compared with the maximum acceleration/deceleration value that may be allowed from the point of view of stability. On the basis of the lower of these values, optimum gain is determined and set in the position controller and/or a path planning parameter.

20 Claims, 12 Drawing Sheets

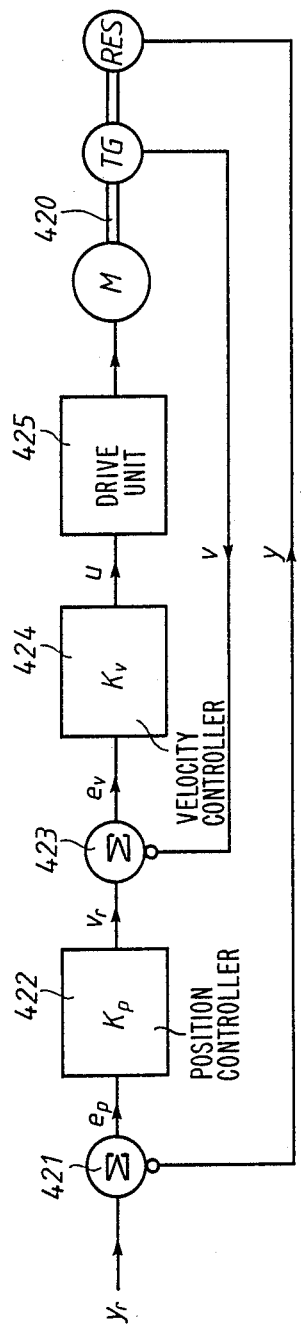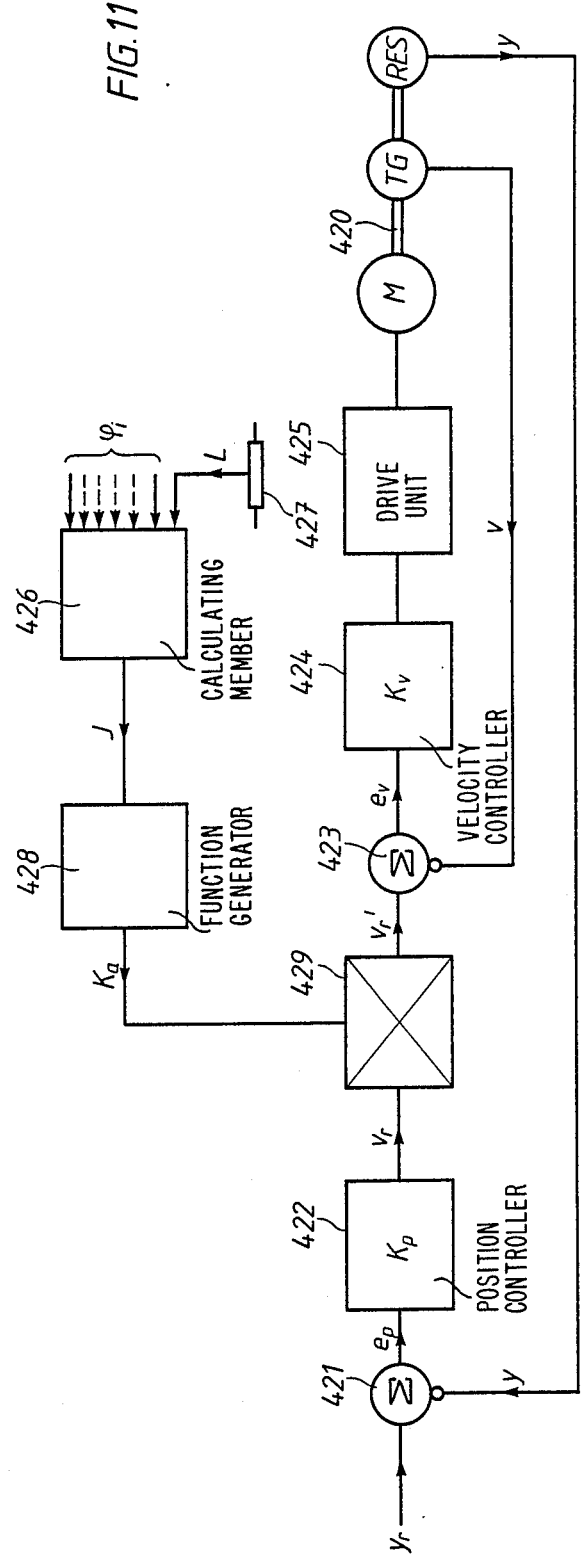
FIG. 10
FIG. 11

METHOD AND A DEVICE FOR OPTIMUM CONTROL OF CONTROL PARAMETERS IN AN INDUSTRIAL ROBOT

TECHNICAL FIELD

The present invention relates to a method for optimum parameter control of axis controllers in an industrial robot, which has a plurality of movement axes and for each axis a drive motor and an axis controller for controlling the axis movement in accordance with desired values supplied to the controller, as well as computer equipment for controlling the robot.

The invention also relates to a device for carrying out the method.

BACKGROUND ART

The invention relates to an industrial robot of, for example the types described in the following ASEA pamphlets: CK 09-1101E, CK 09-1102E, CK 09-1103E, CK 09-1109E, A 09-1030E, A 09-1111E, A 09-1113E.

Such a robot has several movement axes, typically six axes. For a certain axis the mass moment of inertia, the effect of gravity and the effect on the axis of movements in other axes may vary within wide limits in dependence on the current positions of all the axes and on the mass of the load borne by the robot. When designing and trimming the position control system of each axis, the control parameters must be limited so as to obtain rapid and stable operation also in the operating case which is most unfavorable from the point of view of control. This means that acceleration and deceleration of the axis movement generally will be far below the optimum values. This, in turn, means that the time taken for a movement between two points will be unnecessarily long, and this applies particularly to movements over short distances. In many applications, for example spot welding and assembly, the work program of the robot consists of a large number of relatively short movements. The so-called cycle time, i.e. the time for carrying out the program, will, especially for these applications, be long, which is a serious drawback from the point of view of economy and production technique.

OBJECTIVES OF THE INVENTION

The invention aims to provide a method and a device for controlling an industrial robot, in which the cycle time can be greatly reduced in comparison with prior art robots. Further, the invention aims to provide a method and a device in which these advantages can be achieved with moderate calculation capacity of a computer included in the control equipment of the robot.

What characterizes a method and a device according to the invention will be clear from the accompanying claims.

BRIEF DESCRIPTION OF THE DRAWING

An example of an embodiment of the invention will be described below with reference to the accompanying FIGS. 1-8, wherein:

FIGS. 9-11 show a robot and a control system according to a further embodiment of the invention, wherein FIG. 9 schematically shows the construction of the robot and its control system, FIG. 10 shows a prior art axis servo in such a robot, and FIG. 11 shows how the axis servo can be designed according to the invention.

DESCRIPTION OF THE PREFERRED EMBODIMENT

Figure 1:
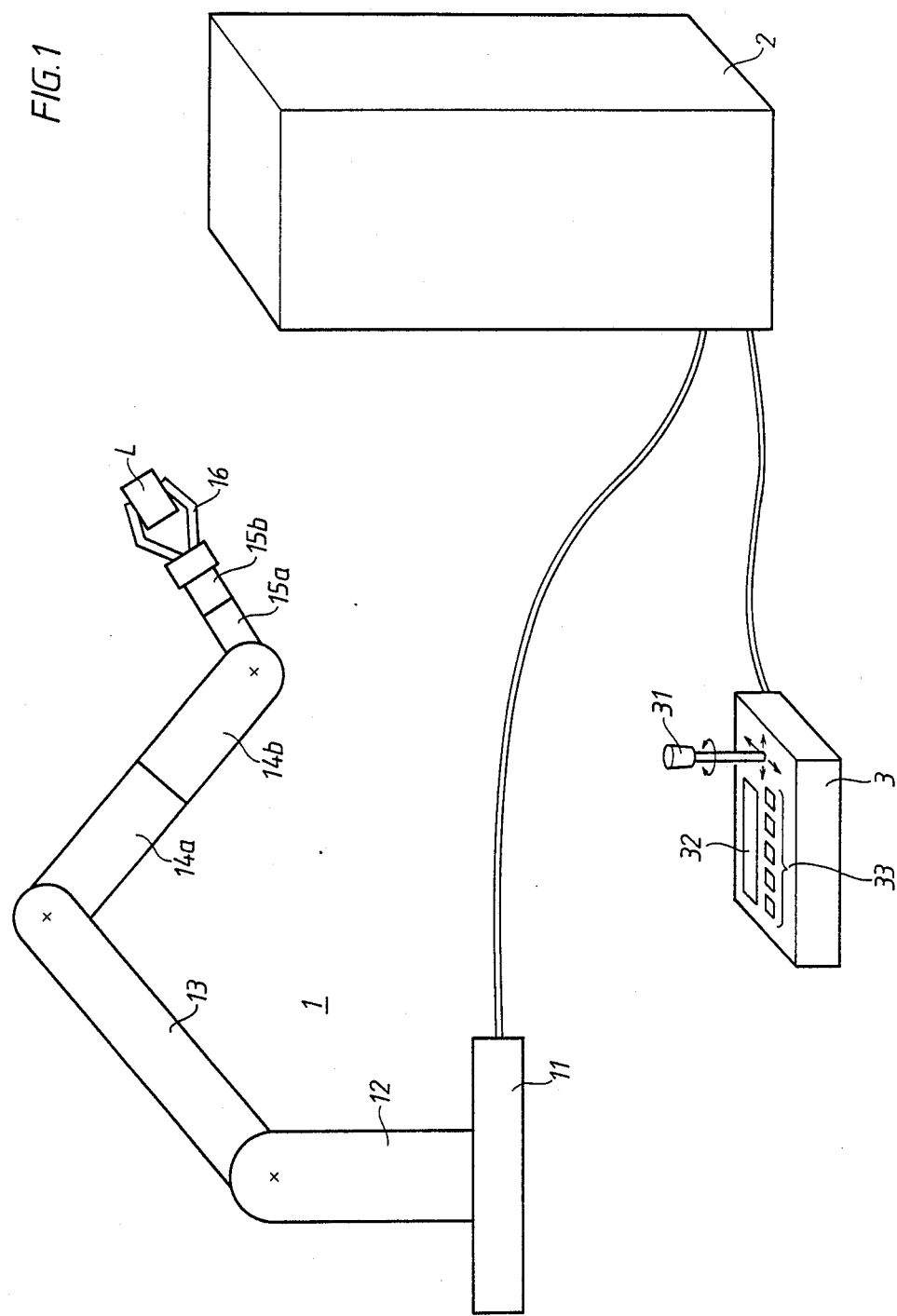
FIG. 1 schematically shows an industrial robot to which the invention can be applied.

FIG. 1 shows a schematic view of an industrial robot, to which the invention can be applied. The mechanical part 1 of the robot comprises a base plate 11, which may be fixedly arranged on a floor or other foundation. A column 12 is turnable about a vertical axis. A lower arm 13 is turnable about a horizontal axis through the upper part of the column 12. An upper arm 14 is turnable about a horizontal axis through the outer end of the lower arm 13. The upper arm 14 consists of two parts, 14a and 14b, the part 14b being turnable relative to the part 14a about and axis coinciding with the longitudinal axis of the arm 14. The arm 14 supports a robot hand 15, which is turnable about an axis through the outer end of the arm 14. The robot hand 15 consists of two parts, 15a and 15b, the part 15b being turnable in relation to the part 15a about an axis coinciding with the longitudinal axis of the hand 15. The outer part 15b of the hand 15 supports a gripper 16, which in turn supports an object L. As an alternative or in addition, depending on the field of application, the robot hand 15 may support a work tool, for example a screw driver, a spot welding equipment, or a spray gun.

The control unit 2 of the industrial robot comprises supply devices for the necessary electric voltages, drive devices for the drive motors in the different robot axes, computer equipment for carrying out the calculations, logical decisions, etc., which are necessary for controlling the robot during the programming and operation, a program memory for storing the coordinates for a number of positions which determine the movement of the robot and the orientation of the robot hand during automatic operation and for storing the instructions which the robot are programmed to carry out in the various positions. Further, the control unit comprises necessary communication units, digital-analog converters, etc.

Furthermore, the industrial robot has an operating unit 3, primarily intended for operation of the robot during the programming phase. The unit 3 is provided with a joystick 31, which is movable in three degrees of freedom and by means of which the position and orientation of the robot hand 15 can be controlled during the programming. Further, the operating unit 3 has a presentation unit 32 as well as a number of operating pushbuttons 33 for entering instructions, commands, numerical data, etc.

The control unit 2 is connected to the mechanical part 1 and to the operating unit 3 by means of electric cables.

Figure 2:
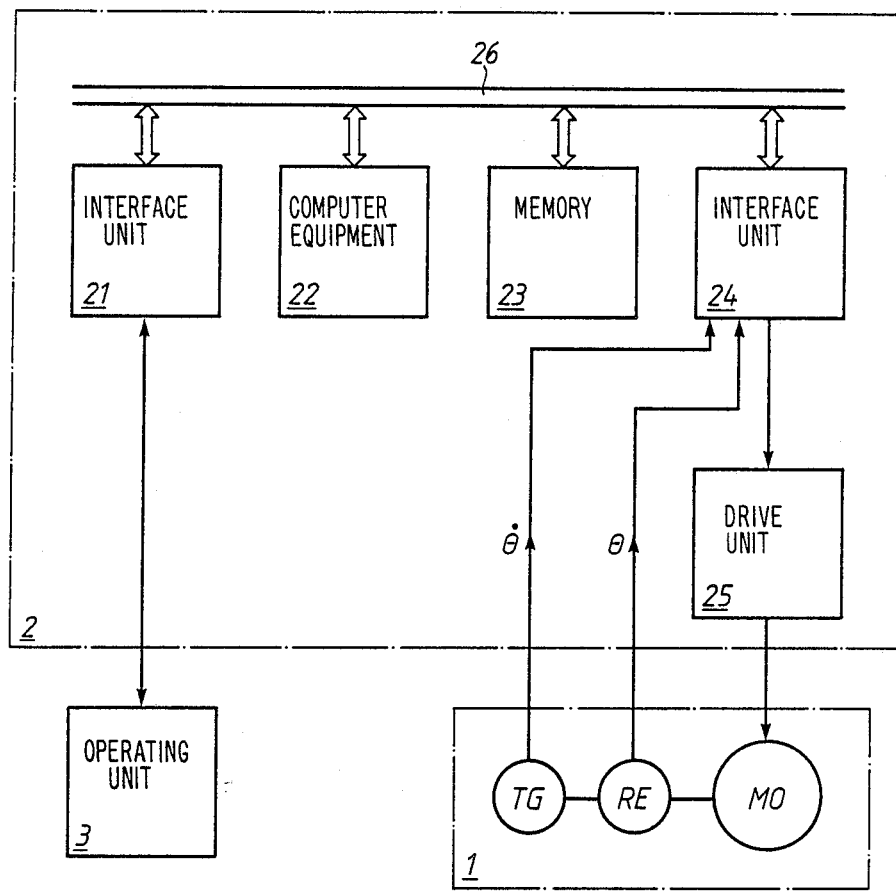
FIG. 2 schematically shows the construction of the control system of the robot and its connection to the operating unit of the robot and the drive motors of the robot.

FIG. 2 shows schematically some of the units included in the control unit 2 and their connections to the mechanical part 1 and to the operating unit 3. The control unit 2 comprises a databus 26, by means of which the units 21-24 communicate with each other. The operating unit 3 is connected to the databus 26 by way of an interface unit 21. Further, a computer equipment 22 is connected to the databus 26. The computer equipment 22 controls the robot during the programming phase and during automatic operation and carries out the calculations necessary for the control, for example, in a manner known per se, the interpolation of a number of intermediate positions between each pair of programmed positions. The computer equipment 22 also carries out the calculations which, according to the invention, are carried out for control of the parameters of the axis controllers.

Further, a memory 23 is connected to the databus 26. In the memory 23 there are stored, once and for all, the general programs necessary for control of the robot. Further, there are stored in the memory 23, during the programming of the robot the coordinates for the points which define the desired movement and orientation of the robot during automatic operation. Further, there are stored in the memory 23 the data which are necessary for the parameter control according to the invention, as will be described below.

The units 22 and 23 only indicate functions, and the two units need not be physically separated. Further, the computer equipment 22 may serve one or several computers and one or several memories.

FIG. 2 shows the drive equipment for one of the axes of the robot and the specific control equipment belonging to that axis. The robot axis has a drive motor MO, which drives the movement in the axis and to which there are connected a resolver RE and a tachometer generator TG. The motor MO may, for example, be an a.c. motor, which is supplied from a drive device 25, which may be a pulse width modulated inverter. The drive device 25 then delivers an a.c. voltage whose frequency, amplitude and phase position are controlled by the computer equipment 22 of the control unit 2 via an interface 24 in such a way that the desired motor torque is obtained at each moment. Alternatively, the drive motor MO may consist of a d.c. motor, whereby the direct current supplied to the power winding of the motor MO is controlled by the drive device 25, which may then be, for example, a controllable rectifier or a d.c. voltage converter.

A resolver RE is mechanically connected to the motor shaft and delivers a signal $\theta$ which is a measure of the instantaneous rotation in the robot axis relative to a zero position (synchronization position). Further, a tachometer generator TG may be mechanically connected to the robot axis and deliver a signal $\dot\theta$ which is a measure of the current speed of rotation in the axis in question. In other embodiments, the speed of rotation can be calculated from the resolver signal. The interface unit 24 comprises necessary supply equipment for the resolver RE as well as necessary converters for converting into digital form the signals from the resolver RE and the tachometer generator TG.

For the sake of simplicity, FIG. 2 shows only equipment for one single axis of the robot. The drive and control equipment (24, 25, 1) for the other axes are formed in the same way as that shown in FIG. 2, digital and analog multiplexing of signals being made.

Figure 3:
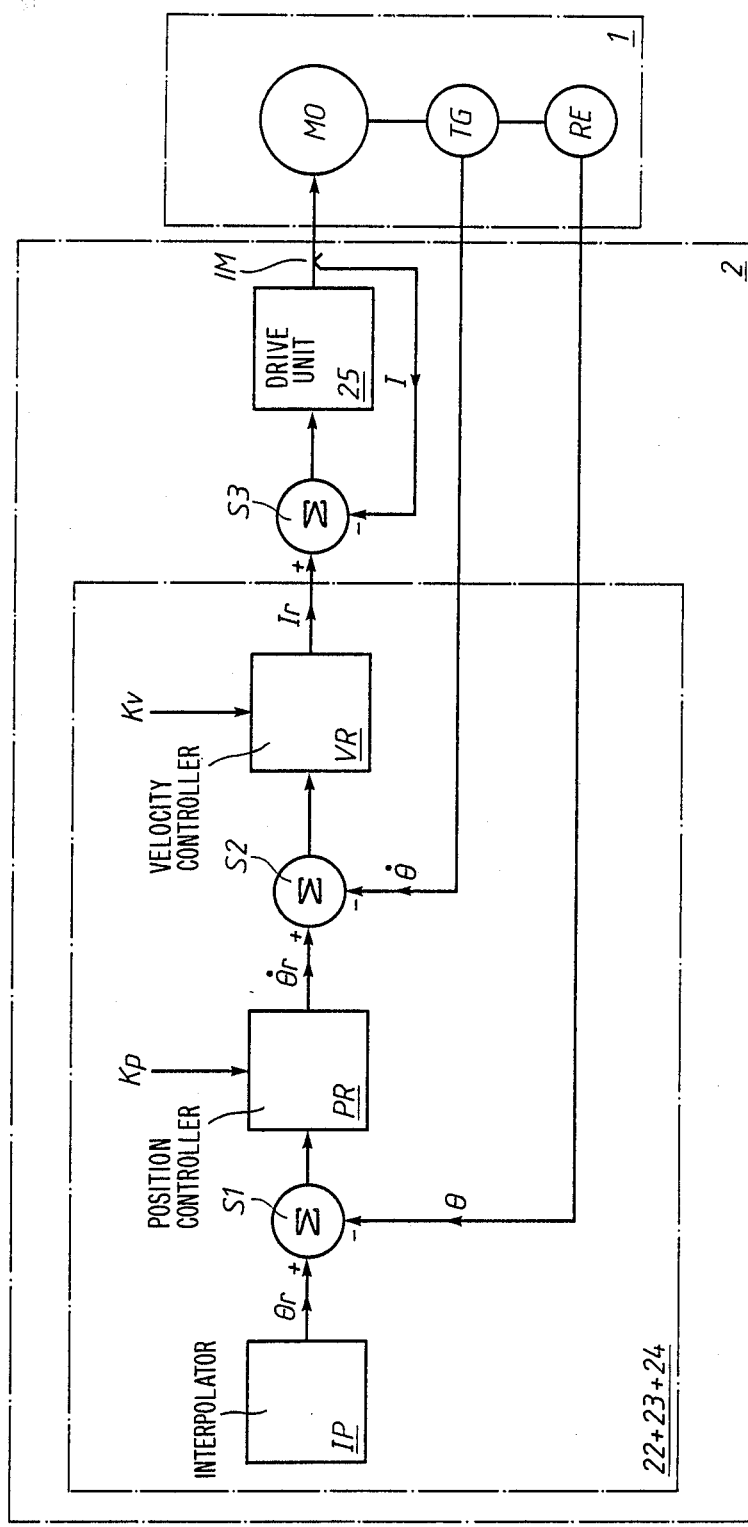
FIG. 3 shows the mode of operation of the controller of a robot axis.

FIG. 3 shows the embodiment of the position control system for the robot axis. The functions shown within the square 22+23+24 are carried out by the robot computer but are described in the following, for the sake of simplicity, as if the functions were carried out by hardware circuits.

An interpolator IP interpolates forward a number of positions and wrist directions between each pair of positions and directions stored in the program. The positions and directions interpolated forward are expressed in the basic coordinate system of the robot and are transformed into coordinates in the axis system of the robot, and are fed in the form of position reference values (angular reference values) to the position controllers of the different axes. The position reference value obtained for one axis is designated $\theta r$. In a summation circuit S1 the reference value is compared with the actual value $\theta$ obtained from the resolver RE. The difference is supplied to a position controller PR. This may be a purely proportional controller, and in that case the position reference values are suitably fed into the position controller at such a rate that the axis position $\theta$ during acceleration and deceleration follows a parabolic path in dependence on time and in such a way that the acceleration and the deceleration, respectively, are constant. Alternatively, the position controller may be provided with a parabolic gain function which is adapted such that the output signal of the controller is a parabolic function of its input signal. Also in this way a constant acceleration (current limit) and deceleration (controlled linear speed ramp), respectively, in the robot movement are obtained. The gain Kp of the position controller is variable and is controlled in the manner which will be described below.

The output signal $\dot\theta r$ of the position controller constitutes the velocity reference value of the system and is compared in the summator S2 with the velocity reference value $\dot\theta$ obtained from the tachometer generator TG (alternatively, with the velocity value $\dot\theta$ calculated from the resolver signal). The error signal is supplied to a velocity controller VR, the gain Kv of which may be constant or variable (see below). The output signal of the velocity controller VR constitutes the current reference Ir for the drive device 25. The current reference is compared in a summator S3 with the actual value I of the motor current obtained from a measuring device IM. The deviation between the currents controls the voltage of the drive device 25 in such a way that the motor current will follow the desired value Ir.

Figure 4:
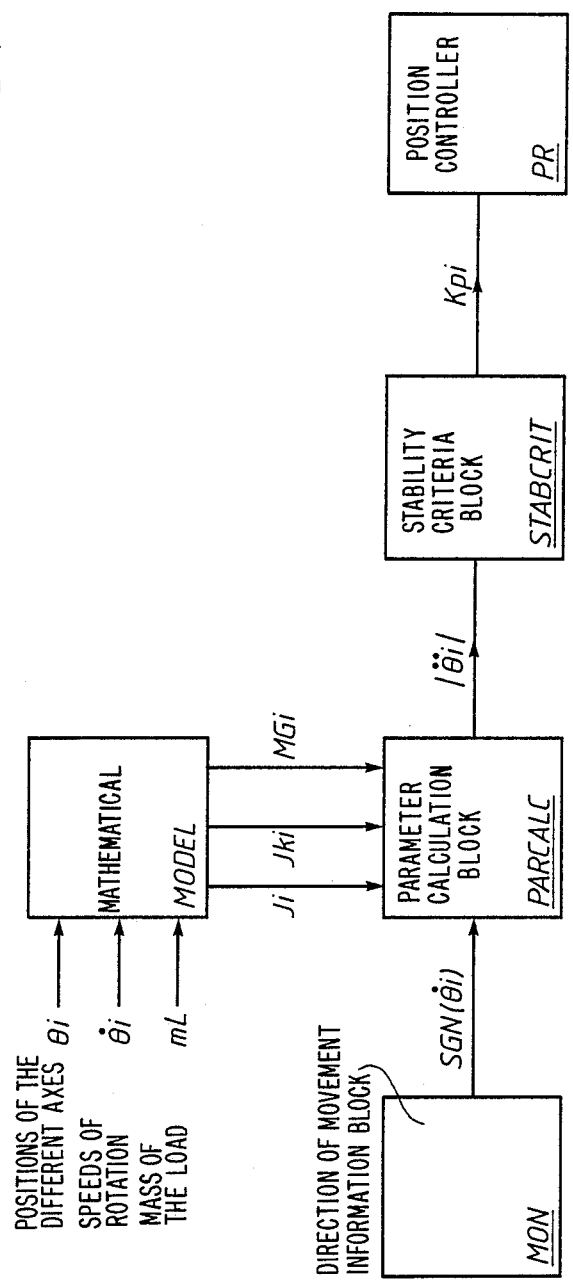
FIG. 4 shows the sequence of calculations and the dataflow in a method and a device according to the invention.

FIG. 4 shows schematically the calculation and decision procedure for determining and setting the gain of the position controller PR. In the block designated MODEL, the mass moment of inertia Ji of the axes, the coupled mass moment of inertia Jij between the axes (Jij being the coupled moment of inertia between axis i and axis j), and the moments Mgi caused by gravity are calculated for the different axes of the robot (i being an index which is 1 for axis 1, 2 for axis 2, etc). The calculation is performed in a manner which will be described in greater detail below in dependence on the positions $\theta i$ of the different axes, the speeds of rotation $\dot\theta i$, and on the mass mL of the load L carried by the robot at the particular time. The calculation is performed with the aid of a mathematical model set up in advance, which may be more or less approximate depending on robot mechanics and available processor capacity.

In the block designated PARCALC an equation system has been set up, which for each robot axis indicates the relationship between acceleration, motor torque, friction torque, gravity torque, mass moment of inertia, coupled mass moment of inertia, and direction of movement. Information about the direction of movement is obtained from the block MON, the output signal $SGN(\dot\theta i)$ of which indicates the direction of movement in the axis. The equation system is solved while assuming that maximum available motor torque prevails in each axis, and as a result the maximally available acceleration $|\ddot\theta i|$ is obtained for each axis, under the assumption stated above. For each axis the latter value is compared with the maximum acceleration/deceleration that may be permitted for the axis with retained satisfactory control properties. That of the two compared values which has the lower absolute value is used for setting the gain Kpi of the position controller.

Since the dynamic calculations have to be carried out in real time, it is important to select a suitable mathematical model for the mechanical properties of the robot, for if no suitable mathematical model is selected, the calculation volume will be so large that it will be difficult or impossible to carry it out with a reasonable contribution of computer capacity. Further, it is suitable that the model—which necessarily must be approximate—is chosen in such a way that it may be supplemented in a simple manner in order to increase its accuracy. Also, it should be of such a kind that it may be used, without extensive modifications, to describe new robot structures.

A mathematical model will be described below in which the advantageous properties mentioned above have been achieved by a suitable selection of approximations. The first approximation comprises omitting physical phenomena of a minor influence in the present case, such as centripetal forces. The second approximation comprises describing the mechanical properties of the robot substantially with the aid of point masses in a manner which will be described with reference to FIG. 5. The third approximation comprises the selection of suitable geometrical approximations to describe the positions of the point masses as functions of the robot configuration in question.

Figure 5:
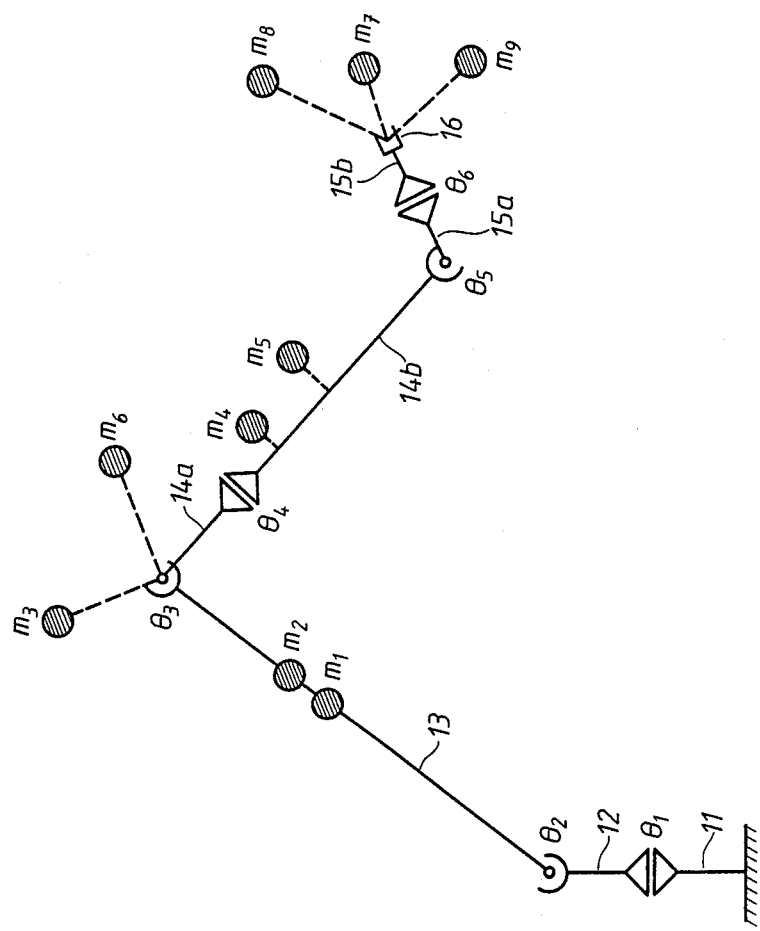
FIG. 5 shows how, according to a preferred embodiment, the calculations of the dynamics of movement of the robot are made while assuming that the masses of the movable parts of the robot and of the load of the robot are approximated with a number of discrete point masses.

FIG. 5 shows schematically the various parts of the robot, which have the same designations as in FIG. 1. The movements in all the robot axes consist of rotations, and $\theta i$ ($i=1, 2 \ldots 6$) designates the position of each axis (angle of rotation relative to a synchronizing or reference position). The chosen point masses are designated m1–m9. The masses m1, m4 and m7 are used for calculating those moments which are generated by the effect of gravity on the axes 2–6 from the arms 13 and 14, the hand 16 and the load L. The mass m2 is used for calculating the mass inertia of the arm 13, the masses m3 and m5 are used for calculating the mass inertias of the arm parts 14a and 14b, and the masses m8 and m9 are used for calculating the mass inertia of the load L. By this relatively simple model, a good approximation may be obtained of the dynamic properties of the current robot by a suitable choice of the sizes and positions of the point masses.

The coupled mass inertia is calculated either from the inertial masses or the gravitational masses in dependence on the design of the axis transmissions. For example, the gravitational masses are used for the coupled mass inertia between axis 2 and axis 3 because of the tie rod transmission of axis 3, whereas, for example, the coupled inertia between axes 5 and 6 is calculated by means of the inertial masses.

The mass m6 in an additional mass which is used for calculating the gravity torque and the mass inertia caused by a possible extra load, supported by the arm 14 (for example, a reel of welding wire or a current supply unit for a spot welding gun). Once the mathematical model is thus chosen, the equations which describe the dynamics of the robot can be set up from known mechanical relationships. As an example there are shown below the expressions for the mass inertia J3 of the axis 3 and for the torque Mg3 caused by the effect of gravity on the axis 3:

$$J_3 = J_{30} + m_3(l_{33})^2 + m_5(l_{35})^2 + m_6(l_{36})^2 + + m_7(L_{35} + l_{57} \cos(\theta_5 - \theta_3))^2 \quad (1)$$

$$M_{g3} = m_4 \, g \, l_{34} \sin(\theta_3 + \theta_{34}) + m_6 \, g \, l_{36} \sin(\theta_3 + \theta_{36}) + \quad (2)$$
$$m_7 \, g \, (L_{35} \sin(\theta_3) + l_{57} - \cos(\theta_5 - \theta_3) \cos\theta_3 - l_{57} \sin(\theta_5 - \theta_3) \cos\theta_4)$$

where
- Ji: total mass inertia in axis i
- Jio: moment of inertia in motor and gear in axis i
- mi: mass of point mass i
- lij: distance between axis i and point mass j
- Lij: distance between axis i and axis j
- $\theta i$: position (angle) of axis i
- Mgi: torque on axis i, caused by gravity
- g: gravity constant
- $\theta ij$: position of point mass j expressed as angular position relative to axis i The following geometrical approximations have been made here:
- The distance from the x-axis of the wrist coordinate system of the point mass representing the load has been omitted
- The mass inertia of the load has been calculated using the gravitational mass instead of the equivalent masses of inertia
- The influence on axis 4 in those cases where the position in axis 5 deviates from the reference position has been omitted Since the axes influence each other, relationships must be set up which indicate the coupling between the different axes. As an example the expression which indicates the coupled mass inertia J65 between axes 5 and 6 is shown:

$$J_{65} = -m_8 \, l_{68} \, (G_{65} \, l_{68} + l_{58} \cos(\theta_{58}) \sin(\theta_6 + \theta_{68})) - \quad (3)$$
$$m_9 \, l_{69} \, (G_{65} \, l_{69} + l_{59} \cos(\theta_{59}) \sin(\theta_6 + \theta_{69}))$$

where
- Jij: the coupled mass inertia between axes i and j
- Gij: the transmission ratio between axes i and j.

When mass inertia, moment of gravitational force, and coupled mass inertia have been calculated, these parameters can be used for updating the dynamic equations which can be set up for each axis:

$$J_i \ddot{\theta}_i = M_i \pm F_i + M_{g1} + \sum_{j \neq 1} J_{ji} \ddot{\theta}_j \qquad (4)$$

where
$\ddot{\theta}i$ and $\ddot{\theta}j$: the acceleration of axis i and axis j, respectively
Mi: the motor torque of axis i
Fi: the friction torque of axis i.

When setting up the equation system described above, describing the dynamics of the axes, it has been assumed that the different parts of the robot are rigid and without play, which results in a model which is satisfactory for determining those control parameters which give optimum acceleration and deceleration, respectively. If considered justified, of course, the model may be sophisticated, for example, by taking into consideration the elasticity and any existing play.

As mentioned above, the desired optimum acceleration and deceleration, respectively, in each axis may be obtained in two different ways. According to the first one, the position controller PR may be arranged with a parabolic transfer function, and according to the other one the position reference $\theta r$ may be calculated in such a way that the position during acceleration and deceleration follows a parabolic course as a function of time. The invention describes a method which may be used for both of these alternative embodiments of the position control. The subsequent part of the method consists of two steps.

In the first step those maximum acceleration and deceleration values are calculated, which are obtained while assuming that the maximum available motor torque is used in each axis. For each axis the dynamic relationship set up above (equation 4) is then used for each axis. An equation system is then set up for the acceleration case, where equation 4 has the following form:

$$J_i \cdot |\ddot{\theta}_i| = ||M_{imax}| - F_i| + M_{gi} \cdot SGN(\theta_{ir}) + \qquad (5)$$
$$\sum_{j \neq 1} J_{ji} \cdot |\ddot{\theta}_j| \cdot SGN(\theta_{ir}) \cdot SGN(\theta_{jr})$$

where
$|\ddot{\theta}i|$: maximum possible acceleration value
Mimax: maximum available motor torque
$(\theta ir)$: velocity reference $$SGN(\theta ir) = \begin{cases} +1 \text{ if } \theta ir \geq 0 \\ -1 \text{ if } \theta ir < 0 \end{cases}$$

In the case of deceleration, equation 4 may be written as follows:

$$J_i \cdot |\ddot{\theta}_i| = ||M_{imax}| + F_i| - M_{gi} \cdot SGN(\theta_i) + \qquad (6)$$
$$\sum_{j \neq 1} J_{ji} \cdot |\ddot{\theta}_j| \cdot SGN(\theta_i) \cdot SGN(\theta_j)$$

where $\theta i$: the actual value of the velocity $$SGN(\theta i) = \begin{cases} +1 \text{ if } \theta i \geq 0 \\ -1 \text{ if } \theta i < 0 \end{cases}$$

The two equation systems for acceleration and deceleration, respectively, set up as above, can be solved, whereby maximally attainable absolute values of acceleration and deceleration, respectively, are obtained for the various axes. As an example, the expression thus obtained for deceleration in axis 2 is given below, while assuming that the only inertia coupled to axis 2 is derived from axis 3:

$$|\ddot{\theta}_2| = \{||M_{2max}| + F_2| - M_{g2} \cdot SGN(\theta_2) + J_{32}(||M_{3max}| + \qquad (7)$$
$$F_3| \cdot SGN(\theta_3) - M_{g3}) \cdot SGN(\theta_2)/J_3\}/(J_2 - J_{23} \cdot J_{23}/J_3)$$

With the aid of the method now described, $|\ddot{\theta}i|$ will be continuously updated according to those expressions for the various axes which correspond to equation 7 above. Since both Ji, Mgi and Jij are dependent on the positions of the various axes, $|\ddot{\theta}i|$ will at each moment depend on the current robot configuration.

For high calculated values of the absolute value $|\ddot{\theta}i|$, in certain cases possibly the control properties of the position controllers will not be satisfactory, and therefore, according to the second step in the procedure, a selection according to the following is made:

$$|\ddot{\theta}i|c = \text{Min } \{|\ddot{\theta}i|, |\ddot{\theta}i|\text{max}\} \qquad (8)$$

where
$|\ddot{\theta}i|c$: the acceleration/deceleration value that is used in the subsequent setting of control parameters.
$|\ddot{\theta}i|$: the acceleration/deceleration value, exemplified according to the equations, calculated by equation 7 above.
$|\ddot{\theta}i|$max: the maximally possible acceleration/deceleration value while maintaining satisfactory control properties.

The value $|\ddot{\theta}i|$max is dependent on the mass inertias and on the trimming of the position and velocity controllers (see FIG. 3) $|\ddot{\theta}i|$max is suitably determined by experiments, or by means of simulations, as functions of the mass inertias.

When the optimum acceleration/deceleration value has been determined in accordance with equation 8 above, the control parameters can be set to provide control performance in accordance with the value determined according to equation 8. How this is done depends on which of the two above-mentioned alternative control procedures is used.

In case the position controller PR has a parabolic gain function, the velocity reference $\theta ir$ may be written as:

$$\theta_{ir} = \begin{cases} (c \cdot K_{pi} \cdot e_\theta - K_p \cdot e_\theta^{offs})^{1/n}, \theta_{ir} > \theta_i \\ -(c \cdot K_{pi} \cdot e_\theta - K_p \cdot e_\theta^{offs})^{1/n}, \theta_i > \theta_{ir} \end{cases} \qquad (9)$$

where
$e_\theta$ is the slip (error signal) of the position controller
n is a constant $\approx 2$
Kpi is a proportionality constant (the gain of the position controller)
c is a parabola constant
$e_\theta^{offs}$ is an offset signal.

The parameter optimization can now be made as an adjustment of Kpi in accordance with the following expression:

$$K_{pi} = F(|\ddot{\theta}i|, C, \theta i, \theta ir) \qquad (10)$$

where F is a continuous function which may be derived from the characteristic of the non-linear position controller.

The function F may in a typical case, with the relationship 9 above, have the following appearance:

$$Kpi = \frac{n}{c \cdot (\dot{\theta} ir)^{1-n} \cdot (\theta ir - e_{\theta i})} (|\dot{\theta} i|c - e_{\theta i}) \quad (11)$$

where
n and c are constants defining the parabolic transfer function of the position controller
$e\theta i = \theta ir - \theta i$
$\dot{e}\theta i$: the time rate of change of $e\theta i$.

In the second position control method using dynamic path planning, the position desired value for a position controller being generated as a parabolic function of time, the adjustment of the control parameters of the position control system can be made as follows, it being assumed that the robot computer periodically samples and calculates the values stated:

$$\theta_{ir}(t+T_s) = \theta_{ir}(t) + \dot{\theta}_{ir}(t) \cdot T_s + \frac{1}{2} \cdot |\ddot{\theta}_i| c \cdot T_s^2 \quad (12)$$

$$\dot{\theta}_{ir}(t+T_s) = \dot{\theta}_{ir}(t) + |\ddot{\theta}_i| c \cdot T_s \quad (13)$$

where $T_s$ is the sampling interval.

It has been described above how the gain of the position controller, as well as the inclination of that ramp function which is formed by the position reference values, supplied to the position controller, are influenced to obtain optimum control performance. The desired variation of the gain of the position control loop can alternatively be obtained by simultaneous influence of the gains Kp and Kv, respectively, of the position and velocity controllers.

Figure 6:
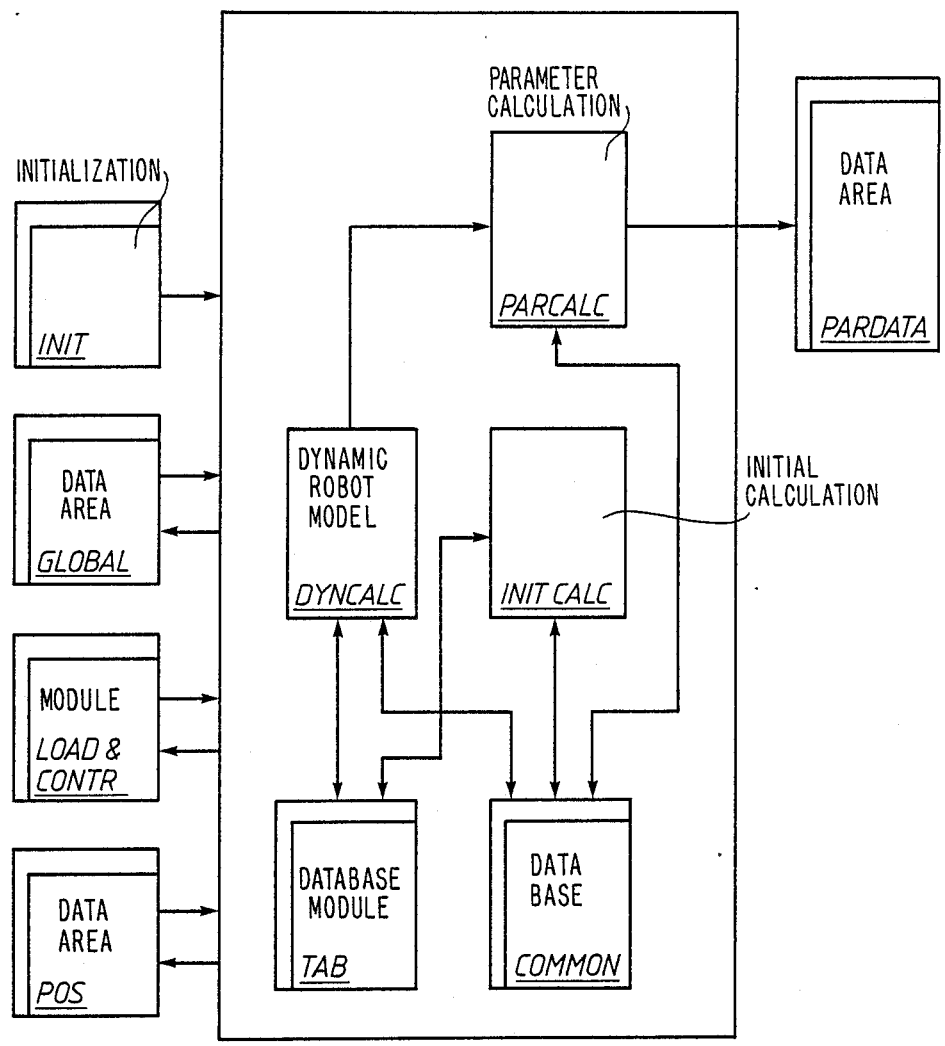
FIG. 6 shows the structure of parts of the robot computer equipment which are relevant to the invention.

FIG. 6 shows schematically how data and calculation functions may be organized in the method according to the invention. The dynamic robot model consists of the block DYNCALC. The choice of acceleration values for the different axes, the determination of optimum value of the control parameters, and the setting of these are implemented in the block PARCALC. To minimize the necessary calculation work by avoiding unnecessary repetition of calculations, such intermediate results of the calculations which may be utilized for subsequent calculations are continually stored in database COMMON. Upon startup of the system, as large a part as possible of the necessary calculations are carried out in the block INITCALC, i.e. such calculations the result of which is not influenced by configurational changes to which the robot is subjected during operation. These calculations are controlled by the block INIT. Such functions which require extensive calculations, for example trigonometric functions, can suitably be implemented, in order to reduce the necessary calculating capacity, in the form of tables which are located in module TAB. The functional block for parameter setting also communicates with a data area GLOBAL, which contains such data which the parameter setting functions have in common with other robot control system functions. A module LOAD & CONTR contains necessary data and functions for startup and control of the parameter setting functions. These functions also communicate with a data area POS, which contains position and velocity values for the different robot axes, etc. The optimum values of the control parameters, calculated by the parameter calculating function PARCALC, are supplied to a data area PARDATA, from which they are continually fetched during the operation of the robot and utilized to influence the control parameters of the position controllers.

Figure 7:
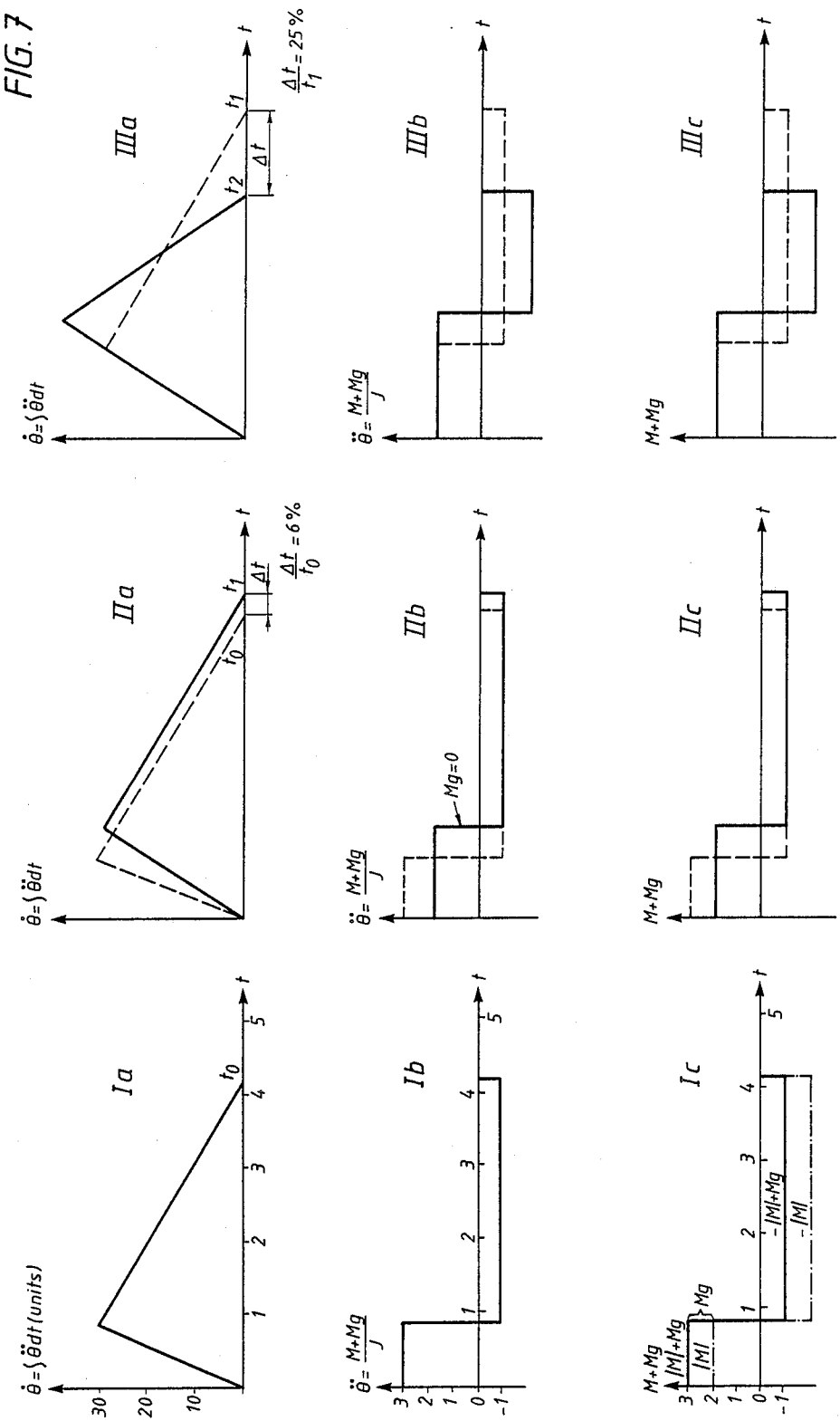
FIG. 7 shows examples of how, according to the invention, the time for a movement between two points can be reduced.

A parameter optimization according to the invention leads to considerable reductions of the cycle times, especially for such short movements where the deceleration immediately precedes the acceleration. This is illustrated in FIG. 7, which shows three different cases, I-III. For each case the top figure shows the velocity, the middle figure the acceleration, and the bottom figure the moment, as functions of time. All three cases relate to axis 2. In FIG. 7
$\dot{\theta}$ designates velocity
$\ddot{\theta}$ designates acceleration
M designates motor torque
Mg designates torque caused by gravity
J designates moment of inertia.

Case I, shown to the left, relates to the case where the moment of gravitational force has its maximum value. During the acceleration, the parabolic gain function of the position controller causes the drive motor to give its maximum moment, to which in this case the gravity torque is added. Similarly, during the deceleration phase, the parabolic gain function of the position controller gives a motor torque close to the maximum value, but since the gravity torque now has the opposite direction, the deceleration will be considerably slower than the acceleration. With a worst case trimming, Kp is set at a value corresponding to the deceleration in case I.

In case II the parameters of the position control system are assumed to be adjusted for the worst case according to case I. In case II the robot configuration is assumed to be such that the moment of gravitational force is zero. The unbroken curves in case II relate to this case, whereas the broken curves by way of comparison show the sequences according to case I. As will be seen, maximum motor torque is obtained during the acceleration phase, whereas during the deceleration phase the deceleration has the value trimmed for case I. The deceleration therefore takes unnecessarily long time in relation to the available motor torque. The time for the movement is t1, which exceeds the corresponding time t0 in case I by 6 percent. Case III illustrates the improvement obtained by means of the invention under the same conditions as those prevailing in case II. Both during acceleration and deceleration the drive motor will work with maximum torque. The total time t2 for the movement is 25 percent shorter than in case II.

The operating cases shown in FIG. 7 are based on greatly simplified assumptions and, for example, only the gravitation of the axis has been taken into consideration. A more complete calculation, taking into consideration also the coupled moments of inertia and the variations in the mass inertias, shows that it is possible to reduce the time for a certain movement by up to 40 percent. A reduction of this order of magnitude is of greater economic and practical importance in such robot applications as spot welding, assembly, gluing, etc. In addition to this considerably increased speed of action in the work of the robot, also a reduction of the average position fault during the movement is obtained with the aid of the parameter optimization according to the invention.

Figure 8:
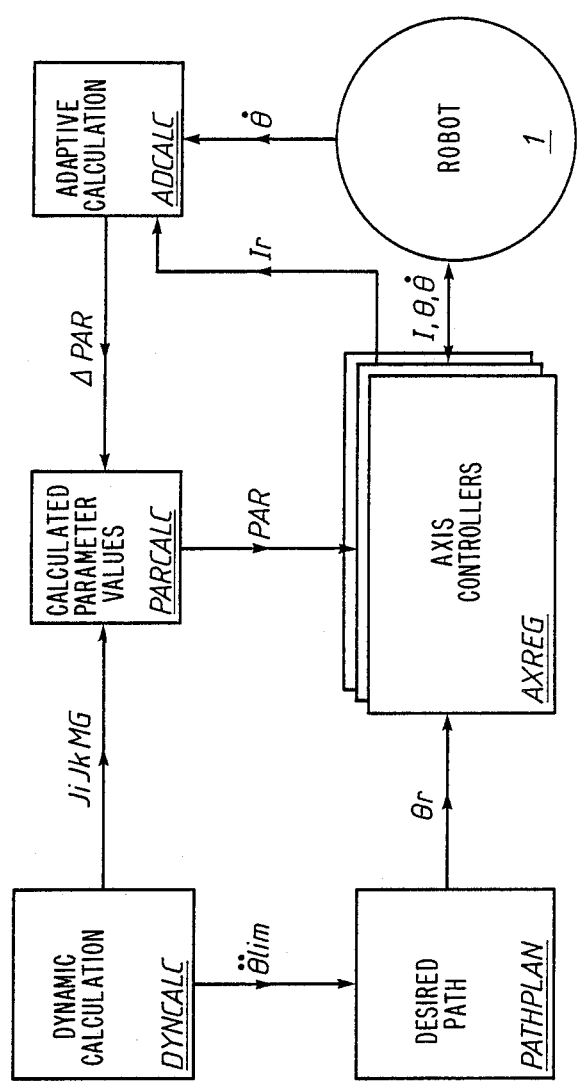
FIG. 8 shows in general form the functions included in a method or a robot according to the invention.

FIG. 8 shows schematically how the parameter optimization according to the invention can be integrated with a robot control system. The blocks DYNCALC and PARCALC have the previously described functions, namely, to carry out the dynamic calculation and to calculate optimum parameter values, respectively. The calculated parameter values PAR are supplied to the axis controllers AXREG. The dynamic calculations provide the maximally attainable acceleration values $\ddot{\theta}$lim for the different axes. These values are supplied to a functional block PATHPLAN, in which the acceleration value, normally limited by an axis, is translated into such acceleration values in the other axes that the robot will follow the desired path. The functional block PATHPLAN gives the position reference values $\theta r$, which are supplied to the axis controllers. These supply the drive motors of the robot with current I and receive from the robot information about positions $\theta$ and velocities $\dot{\theta}$ in the various axes.

As mentioned above, the dynamic calculations are approximate, which may result in the optimized parameter values becoming too low. To compensate for this, adaptive calculations may be carried out in order to correct, on the basis of the behaviour of the actual robot, the parameter calculations made. This function is performed by the functional block ADCALC. In this block, for example, a measurement of the dynamic deflection of the axes during the deceleration processes can be made and be used for compensation of the approximation faults in the robot model. For example, the deviations of the motor currents from the desired values can be measured and the compensation be made by adjusting the gains generated by the parameter control.

FIGS. 9-13 describe a further embodiment of the invention.

Figure 9:
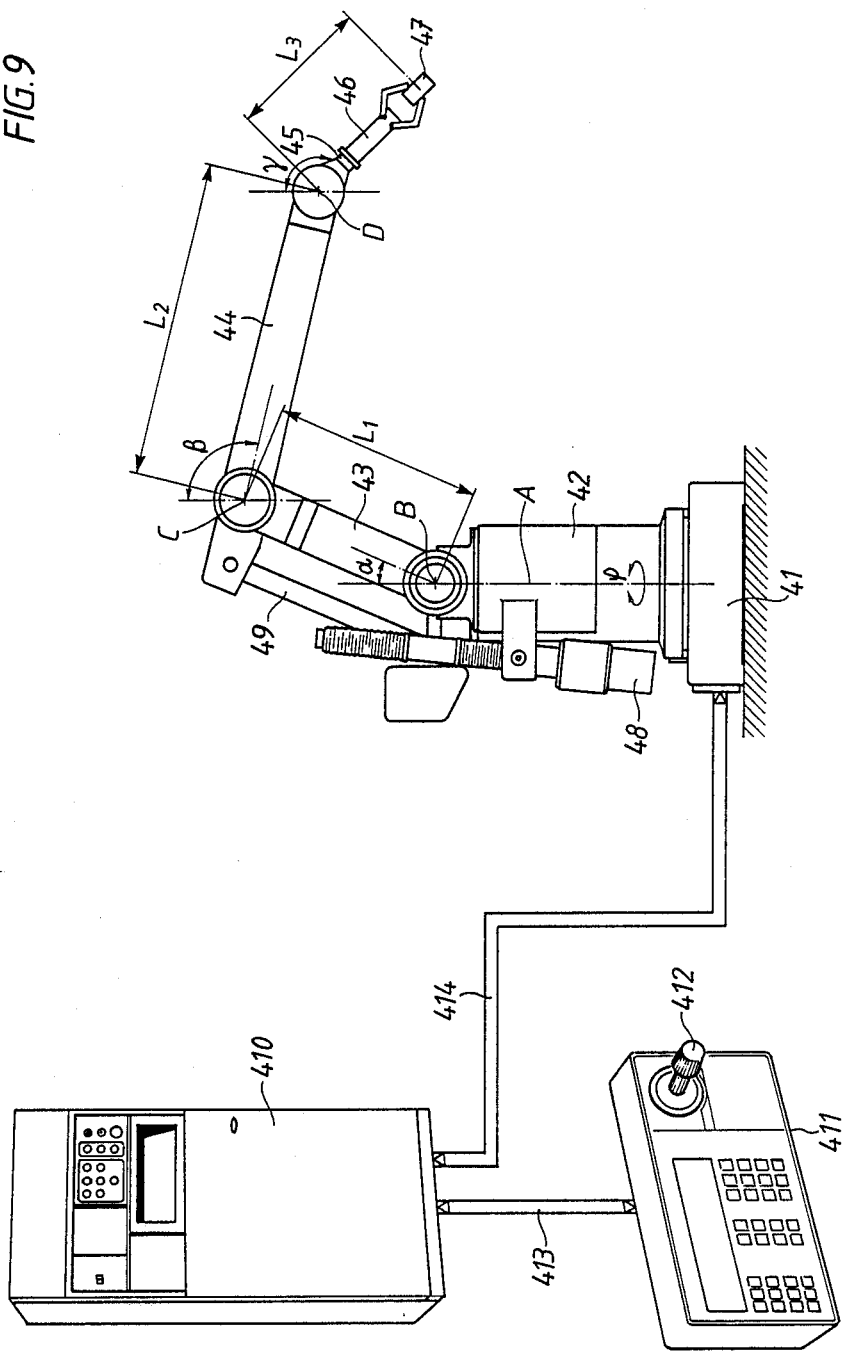

FIGS. 9 and 10 illustrate an industrial robot, known per se, of the type in which this embodiment of the invention may be used. The robot and its control system may, for example, be of the kind described in the following ASEA publications:

CK09-1101E "Industrial Robot System IRB 6/2 and IRB L6/2";
CK09-1103E "Industrial Robot System IRB 90/2";
CK09-1109E "Industrial Robot System IRB 1000".

The robot has a base plate 41, which is mounted on a fixed foundation, for example a floor. A column 42 is arranged to turn relative to the base plate 41 about an axis A shown in FIG. 9. The turning is performed with the aid of a drive motor (not shown) and the turning axis is designated $\phi$. In the upper part of the column 42 a lower arm 43 is turnably journalled about an axis B shown in FIG. 9, which axis is perpendicular to the plane of the paper. The turning angle of the lower arm 43 relative to the direction of plump is designated $\alpha$. The lower arm 43 is turned by means of a drive motor 48 which, by means of a ball screw and an arm, is connected to the lower arm 43. In the upper part of the lower arm 43 an upper arm 44 is turnably journalled about an axis C. The turning of the upper arm 44 is controlled by a second drive motor (not shown), which is arranged adjacent to the drive motor 48 and is connected to the upper arm 44 via a linkage arm 49. The direction of the upper arm 44 relative to the plumb direction is designated $\beta$ and is set by the drive system of the upper arm 44 independently of the turning of the lower arm 43. At the outer end of the upper arm 44 a wrist 45 is turnably journalled about an axis D, which is perpendicular to the plane of the paper. The direction of the wrist 45 relative to the plumb direction is designated $\gamma$ and can be set by means of a drive motor (not shown). A gripper 46 is attached to the wrist 45 and supports an object 47. The robot is assumed to operate as a handling robot, i.e. to grip the object 47 in a collection position, transport it to a delivery position, and drop the object 47 there.

The length of the lower arm 43, i.e. the distance between the axes B and C, is designated $L_1$, and the length of the upper arm 44, i.e. the distance between the axes C and D, is designated $L_2$.

The control system of the robot is arranged in a control cabinet 410. This contains a computer (possibly several computers) with a program memory. During the programming of the robot a sequence of instructions are stored into the program memory, which instructions define the work cycle of the robot and which, during automatic operation, are run through sequentially. The instructions comprise the coordinates for a number of points, which define the path of the robot, as well as the necessary number of coordinates for defining the orientation of the robot hand at each point. Further, at least certain instructions contain information defining a work operation to be carried out by the robot during automatic operation. A programming unit 411 comprises a joystick 412 for manually setting the position of the robot during the programming procedure. The unit 411 further comprises a number of operating members for controlling the robot during programming and automatic operation, for storing instructions, and a number of numerical keys for entering numerical data. The programming unit 411 is connected to the control cabinet 410 via a preferably digital communication channel 413, which may consist of a cable for series or parallel transmission of digital data. The control cabinet 410 further comprises feedback control systems for the different axes of the robot as well as equipment for current supply of the control equipment and of the drive motors. The control cabinet 410 is connected to the actual robot via a channel 414, suitably a cable for transmission of analog and possibly also digital signals between the control cabinet 410 and the robot in both directions.

By the term "degree of freedom" is meant here a movement of the robot which is independent of the movement in the other degrees of freedom. The turning about axis A thus constitutes a first degree of freedom, the turning of the lower arm 43 about axis B constitutes a second degree of freedom, the turning of the upper arm 44 about axis C constitutes a third degree of freedom, and the turning of the wrist 45 about axis D constitutes a fourth degree of freedom. Thus, the robot shown in FIG. 9 has four degrees of freedom, but in practice the wrist 45 is normally designed with additional degrees of freedom, so that a robot normally used in practice has five or six degrees of freedom.

For each degree of freedom there is arranged a servo system, and FIG. 10 shows an example of such a known servo system. From the computer included in the control system, the servo system is supplied with a position reference value $y_r$. These position reference values may consist of values entered into the program memory or they may be obtained by interpolation between such values. In a summation circuit 421 the reference value is compared with a position response y, which is obtained from a resolver RES. The output signal from the summator 421 constitutes the position error $e_p$ and is supplied to the position controller 422. This has a non-linear, so-called parabolic gain and its gain is designated $K_p$. The output signal of the controller 422 constitutes the velocity reference value $v_r$ and is supplied to a summator 423, where it is compared with the velocity response v, which is obtained from a tachometer generator TG. The output signal from the summator 423 constitutes the velocity error $e_v$ and is supplied to a velocity controller 424, suitably with a proportional integral differential coefficient effect and with the gain $K_v$. The output signal u of the velocity controller 242 is supplied to a drive device 425, for example a controllable static convertor, which supplied that drive motor M which executes the movement in the degree of freedom in question. To this motor M the tachometer generator TG and the resolver RES are mechanically connected.

FIG. 10 thus shows the servo system which controls the movement in one of the degrees of freedom or axes of the robot. Each one of the other degrees of freedoms or axes has a servo of the same or a similar kind.

In prior art robots of this kind, the gains of the position and velocity controllers are chosen and set in such a way as to obtain stability in the feedback control system for all operating cases occurring in practice. Thus, the gains have to be chosen in view of the critical operating case, and in all other operating cases the servo system will operate with unnecessarily poor feedback control performance.

According to this embodiment of the invention there is arranged, for at least a first degree of freedom, a calculating member for calculating the mechanical moment of inertia of the robot for movement in that degree of freedom. The calculating member is supplied with information about the position of the robot in at least one of the other degrees of freedom of the robot, and about the load of the robot. In dependence on this information, the calculating member forms a quantity representative of the mechanical moment of inertia of the robot in view of the first degree of freedom mentioned. This quantity is supplied to a gain-controlling member, which is adapted to control the gain of the position controller such that this gain is reduced with increasing moment of inertia. According to one embodiment, the gain of the position controller is controlled such that the position feedback control system operates with a constant overswing independently of the current moment of inertia. The gain of the position controller is thereby preferably controlled such that the gain is varied inversely proportionally to the moment of inertia.

Since the moment of inertia for a certain movement is influenced to a considerable extent by the mass of the load supported by the robot hand, according to a preferred embodiment the calculating member is supplied with information about the magnitude of the mass of the load and makes its calculation of the moment of inertia, taking this mass into account. Information about the magnitude of the mass can then suitably be entered manually with the aid of suitable entry members.

In an industrial robot in which the slenderness of the mechanical parts of the robot must be taken into account and the servo system of which comprises subordinate velocity loops, according to the invention a gain-controlling member is arranged to control, in dependence on the calculated moment of inertia, the gain of the velocity controller so that this increases with increasing moment of inertia, preferably such that the velocity feedback control system operates with a constant damping independently of the current moment of inertia. Preferably, the gain of the velocity controller is then controlled so as to vary proportionally to the square root of the moment of inertia, while at the same time the gain of the position controller is controlled so as to vary inversely proportionally to the square root of the moment of inertia.

FIG. 11 shows how, according to the invention, the servo system for one of the robot axes can be designed. The servo system for all the other degrees of freedom, or possibly only some of them, can be designed in a corresponding manner. A calculating member 426 is adapted to calculate the moment of inertia J of the robot. The calculating member 426 may be of analog or or digital kind, in the latter case, for example, a microprocessor. Alternatively, the calculation of J can be carried out with the aid of sub-program in the computer which is normally included in the control system of the robot. The calculating member 426 is supplied with information about the current position of the robot in those degrees of freedom which influence the moment of inertia J for that axis to which the servo system shown in FIG. 11 belongs. In the robot type shown in FIG. 9 the movements in the different degrees of freedom consist of rotations, and the information $\phi_i$ about the position in the different axes is therefore obtained from angular position transducers, for example resolvers in the different axes. The calculating member 426 is also supplied with information L about the mass of the load supported by the robot hand. For a certain work operation the magnitude of the load is generally known and can be set manually for entry into the calculating member 426. FIG. 11 shows schematically how this setting can be made with the aid of a potentiometer 427. In the case of a digital calculating member 426, the magnitude of the load may, instead, suitably be entered with the aid of digital entry members, for example the numerical keys arranged on the programming unit 411 shown in FIG. 9. Further, the control system can be adapted to change value as regards the magnitude of the load, when objects are gripped or dropped, and when objects with variously great masses are handled during a work cycle.

The calculation of the moment of inertia can be made more or less approximate according to the need. As an example of a calculation of J, it is assumed that the servo system according to FIG. 11 controls the turning angle $\phi$ around the axis A in FIG. 9. The following assumptions are made:

the moment of inertia of the column 42 with units fixedly mounted thereon is constant and is designated $J_2$, the load 47 is approximated as a point mass, as far as the arms 43 and 44 and the robot hand 45-46 are concerned, their centers of gravity are located at half length, their moments of inertia around a turning axis through the center of gravity and in the plane of the paper as well as perpendicular to the longitudinal axis of the respective arm are designated $J_{30}$, $J_{40}$ and $J_{50}$, respectively, the other moments of inertia of the arms and the hand are omitted, the masses of the arms and the hand are designated $M_3$, $M_4$ and $M_5$, respectively.

Given these assumptions and the designations indicated above and in FIG. 9, the following relationships are obtained:

$$J_3 = J_{30}\sin^2\alpha + M_3 \left(\frac{L_1}{2} \sin\alpha\right)^2$$

$$J_4 = J_{40}\sin^2\beta + M_4 \left(L_1\sin\alpha + \frac{L_2}{2} \sin\beta\right)^2$$

$$J_5 = J_{50}\sin^2\gamma + M_5 \left(L_1\sin\alpha + L_2\sin\beta + \frac{L_3}{2} \sin\gamma\right)^2$$

$$J_L = M_L(L_1 \sin\alpha + L_2 \sin\beta + L_3 \sin\gamma)^2$$

$$J = J_2 + J_3 + J_4 + J_5 + J_L$$

The sequence of calculations stated above for the current moment of inertia J is only an example, and, according to the need, the calculation may be made both more and less approximate.

The output signal from the calculating member 426 is supplied to a function generator 428, which calculates a quantity $K_a$ according to the expression $$K_a = \frac{J'}{J}$$

where $J'$ is the maximum moment of inertia for the robot axis in question. The quantity $K_a$ is supplied to a multiplier 429, the other input of which is supplied with velocity reference $v_r$ from the position controller 422. The output signal $v_r'$ from the multiplier 429 thus follows the relationship $$v_r' = K_a \cdot v_r = \frac{J'}{J} \cdot v_r$$

The output signal $v_r'$ of the multiplier 429 is compared in the summator 423 with the velocity response v, and the rest of the servo system corresponds to that shown in FIG. 10.

The embodiment of a position feedback control system according to the invention, shown in FIG. 11, is especially suitable for such robots whose different mechanical parts can be regarded as completely rigid units. In such a robot, optimum control properties are obtained, with the aid of a feedback control system according to the invention, within the whole work envelope and independently of the current moment of inertia, i.e. optimum rise time, constant overswing, and constant damping. This entails a considerable improvement over prior art robots, in which those optimum properties could only be obtained at one single point.

Figure 12:
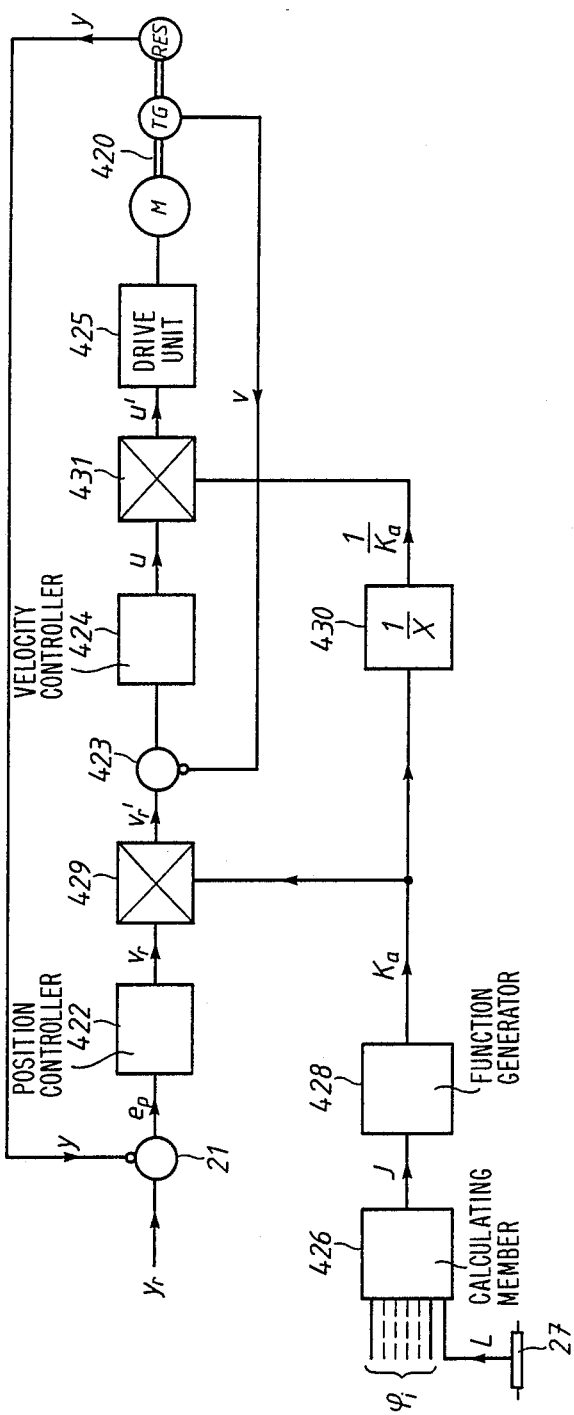
FIGS. 12 and 13 show two variants of this embodiment.

As mentioned by way of introduction, the mechanical parts, especially in large robots, can no longer be regarded as completely rigid units, but suffer from a certain slenderness or resilience. FIG. 12 shows a position feedback control system according to the invention, which is formed for use in such a robot. In the same way as described above with reference to FIG. 11, a calculating member 426 is adapted to calculate the moment of inertia J of the robot axis which is controlled by the servo system. A function generator 428 is adapted to calculate a quantity $K_1$, where $$K_a = \sqrt{\frac{J'}{J}}$$

The quantity $K_a$ is supplied to the multiplier 429 arranged after the position controller 422, where the velocity reference $v_r$ is multiplied by $K_a$ such that the output signal $v_r'$ of the multiplier 429 becomes $$v_r' = K_a \cdot v_r = \cdot \sqrt{\frac{J'}{J}}$$

The quantity $K_a$ is also supplied to a function generator 430, where the quantity is inverted. The output signal $1/K_a$ from the function generator 430 is supplied to a second multiplier 431, to which also the output signal u from the velocity controller 424 is fed. The output signal $u'$ from the multiplier 431 becomes $$u' = u \cdot \frac{1}{K_a} = u\sqrt{\frac{J}{J'}}$$

It has been found that, in the case of a slender robot, the available resources of the feedback control system are utilized to a maximum within the whole work envelope and independently of the current moment of inertia by means of the feedback control system according to FIG. 12. Thus, an optimum rise time, a constant overswing and a constant damping are obtained over the whole work envelope. Furthermore, in relation to FIG. 11, the exciting of oscillations in slender systems is avoided in spite of the fact that the available moment is utilized in a better way than in prior art robots.

Figure 13:
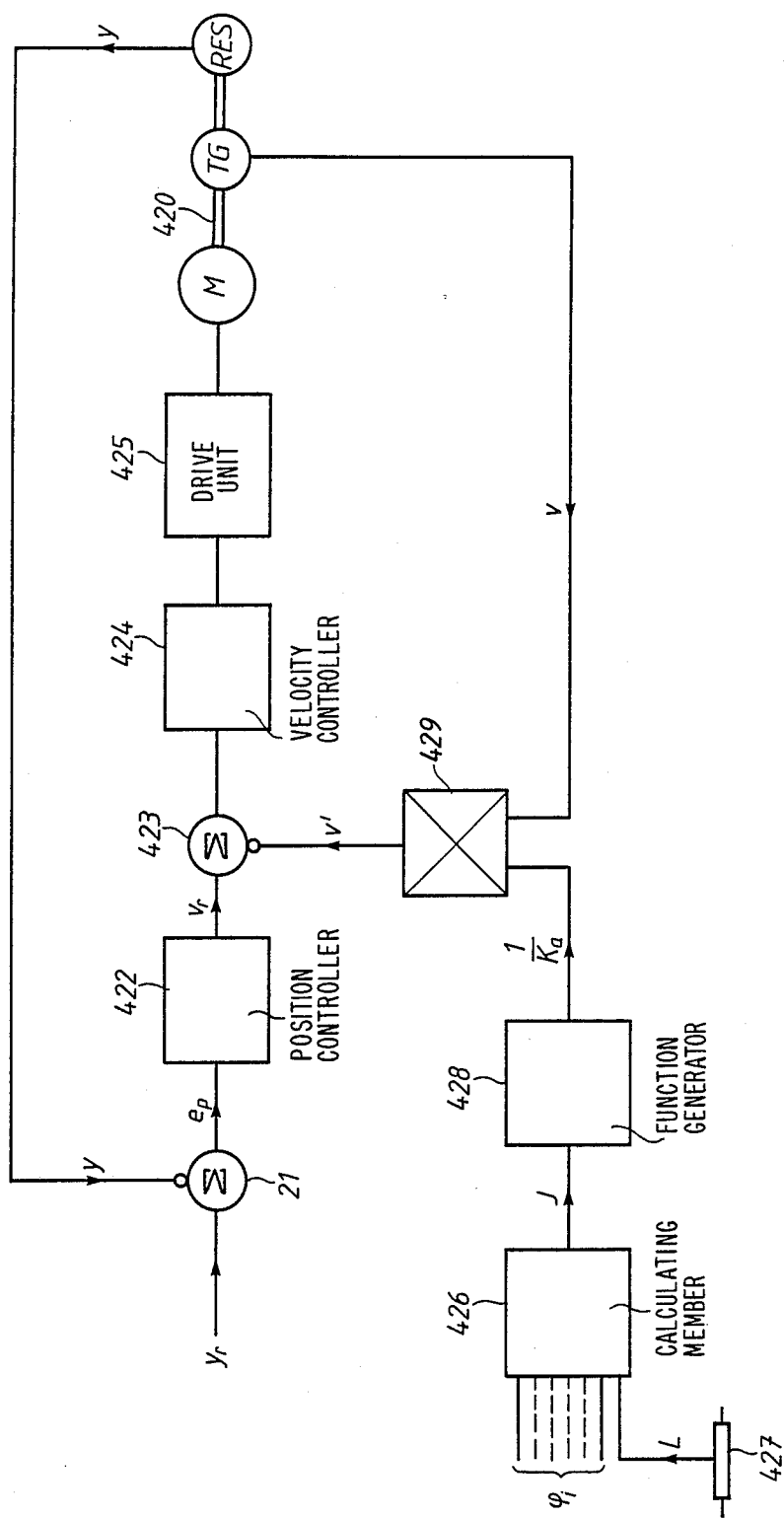

FIG. 13 shows a preferred embodiment of the feedback control system according to the invention shown in FIG. 12. The two multipliers 429 and 431 shown in FIG. 12, with the aid of which the effective gains of the position and velocity controllers are varied in dependence on the moment of inertia, have been replaced in FIG. 13 by one single multiplier 429. To the inputs of this there are supplied the velocity response y as well as the quantity $$K_a = \sqrt{\frac{J'}{J}}$$

The output signal $v'$ of the multiplier 429 thus becomes $$v' = \frac{1}{K_a} \cdot v = v \cdot \sqrt{\frac{J}{J'}}$$

It can be shown in a simple manner that the feedback control system according to FIG. 13 operates in exactly the same way as the system according to FIG. 12 and offers the same considerable improvement of the feedback control properties. However, in the system according to FIG. 13 this improvement is obtained in a very simple way, namely, with the aid of one single multiplier 429.

In the embodiments of the invention described with reference to FIGS. 9–13, the effective gains of the position and velocity controllers are varied by means of multipliers, which, in the case of the embodiments shown in FIGS. 11 and 12, multiply the output signal of the respective controller by a scaling factor dependent on the moment of inertia, and in the case of the embodiment shown in FIG. 13, the same result is obtained by multiplying the velocity response by a moment of inertia dependent scaling factor. It is self-evident, however, that this variation of the gain in dependence on the moment of inertia can be obtained in other ways than those shown above.

In the examples described above, the invention has been described with reference to an industrial robot, the total number of degrees of freedom of which consists of rotation about different axes. The concept "position" then of course relates to the angle of rotation in relation to a certain reference position, and the concept "velocity" then relates to the speed of rotation. However, the invention may just as well be applied to such robot types, known per se, in which certain degrees of freedom consist of translations instead of rotations. The concepts "position" and "velocity" are than given their conventional meanings, namely, linear translation and linear velocity of movement.

The invention has been described above with reference to a certain type of industrial robots, but it may, of course, be applied to other types of robots, for example with a mechanical construction and with a number of degrees of freedom different from those of the robot described above.

In a manner known per se the feedback control systems for the different axes of a robot can be designed either on the basis of analog technique or on the basis of digital technique, or as a combination of these two techniques. Irrespective of how the feedback control system is built up, however, the invention can be applied and offers considerable advantages.

We claim:

1. A method of providing optimal parameter control of axis controllers in an industrial robot having a plurality of movement axes, a drive motor and an axis controller being provided for each axis of the movement axes to control the axis movement in accordance with desired values supplied to the controller, computer equipment being provided to control the robot, the method comprising the steps of:
   (a) describing on the basis of a mathematical model static and dynamic properties of the robot;
   (b) calculating continuously during the operation of the robot maximum acceleration and deceleration values for at least one axis of the movement axes, the calculating being based on the static and dynamic properties of the robot and an assumed value of the maximum available torque of the drive motors; and
   (c) selecting at least one control parameter and/or one path planning parameter in the axis controller of the at least one axis in dependence on the calculated values obtained from the calculating step.

2. Method according to claim 1, wherein the step (a) of describing static and dynamic properties further comprises the steps of:
   (i) setting up a mathematical relationship for each axis to depict the dynamics of the axis with an assumed maximum available motor torque on the basis of the mathematical model; and
   (ii) calculating from relationships obtained from step (i) the respective maximally attainable acceleration and deceleration for each axis.

3. Method according to claim 2, further comprising the steps of:
   (iii) comparing for the at least one axis values of the calculated maximally attainable acceleration and deceleration with a predetermined value chosen to correspond to possible maximal acceleration and deceleration that may be used to maintain satisfactorily the control properties in the control system of the axis; and
   (iv) selecting a control parameter and/or a path generating parameter for the axis controller in accordance with the values compared in step (iii) which has the lower absolute value.

4. Method according to claim 1, further comprising the step of:
   (d) forming the mathematical model while taking into consideration at least one of the following quantities: mass inertia, gravity, coupled mass inertia, centrifugal force, and coriolis force.

5. Method according to claim 4, further comprising the steps of:
   (e) determining a robot model with at least one point mass per robot arm and at least one point mass for a load carried by the robot, the positions of these masses being calculated on the basis of experimentally measured values of the accelerations and motor torque of the robot in a number of different robot configurations; and
   (f) calculating mass inertias from the robot model.

6. Method according to claim 4, further comprising the steps of:
   (g) determining a robot model with at least one point mass per robot arm and at least one point mass for the load carried by the robot, the positions of these masses being calculated on the basis of experimentally measured values of the motor torque of the robot in different configurations; and
   (h) calculating the effect of gravity and the mutual influence between the axes from the robot model.

7. Method according to claim 1, wherein for the industrial robot whose axis controller of an axis includes a position controller, the step (b) of calculating acceleration and deceleration values further comprises the steps of:
   (i) calculating the acceleration and deceleration values, respectively, from the mathematical model; and
   (ii) scaling the calculated values to represent the gain of the position controller.

8. Method according to claim 7, further comprising the step of:
   (iii) varying the gain of the position controller in dependence on the difference between current being used by the motor and a maximum allowed motor current for optimum use of the available motor torque.

9. Method according to claim 1, wherein the industrial robot includes means for supplying the axis controller with position reference values to maintain constant acceleration and deceleration, during accelertion and deceleration, respectively, further comprising the step of:
   (i) setting the acceleration and deceleration values equal to the acceleration and deceleration values, respectively, calculated from the mathematical model.

10. Method according to claim 9, further comprising the step of:
   (j) varying the acceleration value in dependence on the difference between current being used by the motor and a maximum allowed motor current for optimum utilization of the available motor torque.

11. Method according to claim 1, wherein the axis controller includes a velocity controller, the method further comprising the step of:
   (k) varying a control parameter of the velocity controller in dependence on configuration of the robot at any one moment and the mathematical model for compensating damping variations caused by variations in mass inertia and effective spring constant.

12. Method according to claim 1, further comprising the steps of:
   (l) forming, for at least one first degree of freedom in dependence on information about the current position of the robot in at least one further degree of freedom, a quantity representative of the mechanical moment of inertia of the robot for movement in the first degree of freedom; and
   (m) controlling the gain of the axis controller in dependence on the quantity so that the gain decreases with increasing moment of inertia.

13. Method according to claim 12, further comprising the step of:
   (n) controlling the gain of the axis controller such that the axis controller operates with a constant overswing at varying moments of inertia.

14. Method according to claim 12, wherein the robot has a position control system including a subordinate velocity loop with a velocity transducer and a velocity controller, the method further comprising the step of:
   (o) controlling the gain of the velocity controller in dependence on the quantity representative of the moment of inertia so that the gain increases with increasing moment of inertia.

15. Method according to claim 14, further comprising the step of:
   (p) controlling the gain of the velocity controller such that the control system operates with a constant damping at varying moments of inertia.

16. Method according to claim 14, further comprising the step of:
   (q) varying the gain of the velocity controller proportionally to the square root of the moment of inertia.

17. Method according to claim 16, further comprising the step of:
   (r) varying the gain of the position controller inversely proportionally to the square root of the moment of inertia.

18. Method according to claim 16, further comprising the step of:
   (s) multiplying a velocity response from a velocity transducer prior to the comparison with the output signal of the position controller by a quantity which is proportional to the square root of the moment of inertia.

19. Method according to claim 1, wherein for the industrial robot whose axis controller of an axis includes a position controller, the selecting step (c) further includes the step of:
   (i) setting the gain of the position controller in accordance with said calculated values.

20. A device for providing optimum parameter control of axis controllers in an industrial robot having a plurality of movement axes, the robot further having a drive motor and an axis controller for each axis of the movement axes to control the axis movement in accordance with position reference values supplied to the controller, computer equipment being provided to control the robot, the device comprising:
   means for continually computing, on the basis of a mathematical model describing static and dynamic properties of the robot and an assumed value of the maximum available torque of the drive motors, maximum acceleration and deceleration values for at least one axis during operation of the robot; and
   means for selecting, in dependence on the computed values obtained from the computing means, at least one control parameter and/or one path planning parameter in the axis controller of the at least one axis.

* * * * *

UNITED STATES PATENT AND TRADEMARK OFFICE
CERTIFICATE OF CORRECTION

PATENT NO. : 4,819,184

DATED : April 4, 1989

INVENTOR(S) : Mikael Bergman, et al.

It is certified that error appears in the above-identified patent and that said Letters Patent is hereby corrected as shown below:

Title Page: Item (19) should read --Bergman et al.--

Item (75) Inventors should read-- Mikael Bergman, Jarfalla, Torgny Brogardh, Sven Jonsson, Erik Persson and Lars Ostlund, all of Vasteras, Sweden--.

Signed and Sealed this

Twenty-first Day of July, 1992

Attest:

DOUGLAS B. COMER

Attesting Officer

Acting Commissioner of Patents and Trademarks